(12) United States Patent
Schultz et al.

(10) Patent No.: US 9,227,856 B2
(45) Date of Patent: Jan. 5, 2016

(54) SUBMERGED PLATE FORWARD OSMOSIS SYSTEMS

(71) Applicant: HYDRATION SYSTEMS, LLC, Scottsdale, AZ (US)

(72) Inventors: Walter L. Schultz, Scottsdale, AZ (US); Upen J. Bharwada, Scottsdale, AZ (US); John R. Herron, Corvallis, OR (US); Mark Schutter, Albany, OR (US)

(73) Assignees: DEAD SEA WORKS LTD, Beer Sheva (IL); HYDRATION SYSTEMS LLC, Scottsdale, AZ (US)

( * ) Notice: Subject to any disclaimer, the term of this patent is extended or adjusted under 35 U.S.C. 154(b) by 86 days.

(21) Appl. No.: 13/934,163

(22) Filed: Jul. 2, 2013

(65) Prior Publication Data

US 2014/0001122 A1 Jan. 2, 2014

Related U.S. Application Data

(60) Provisional application No. 61/667,375, filed on Jul. 2, 2012.

(51) Int. Cl.
*B01D 63/00* (2006.01)
*B01D 61/00* (2006.01)
*B01D 11/00* (2006.01)
*C02F 1/44* (2006.01)
*B01D 63/08* (2006.01)

(52) U.S. Cl.
CPC .............. *C02F 1/445* (2013.01); *B01D 61/002* (2013.01); *B01D 63/08* (2013.01); *B01D 63/082* (2013.01); *B01D 2315/06* (2013.01); *Y02W 10/37* (2015.05)

(58) Field of Classification Search
CPC .. B01D 61/002; B01D 2315/06; C02F 1/445; C02F 2103/08; C02F 9/00
USPC .............................. 210/641, 644, 321.75, 231
See application file for complete search history.

(56) References Cited

U.S. PATENT DOCUMENTS

| 5,651,888 | A | * | 7/1997 | Shimizu et al. ........... 210/321.64 |
| 2005/0072724 | A1 | * | 4/2005 | Nakayama ..................... 210/280 |
| 2006/0144789 | A1 | | 7/2006 | Cath et al. |
| 2009/0272692 | A1 | * | 11/2009 | Kurth et al. ................... 210/652 |
| 2010/0213129 | A1 | | 8/2010 | Jones et al. |
| 2011/0017666 | A1 | * | 1/2011 | Cath et al. ..................... 210/644 |
| 2013/0001162 | A1 | * | 1/2013 | Yangali-Quintanilla et al. ............................. 210/636 |

(Continued)

FOREIGN PATENT DOCUMENTS

KR 10-1335445 * 11/2013 ............. B01D 61/36

OTHER PUBLICATIONS

International Search Report and Written Opinion mailed Dec. 17, 2014 for corresponding International Patent Application No. PCT/US2013/049166.

*Primary Examiner* — Ana Fortuna
(74) *Attorney, Agent, or Firm* — Graeser Associates International Inc; Dvorah Graeser

(57) ABSTRACT

Described herein is a submerged plate membrane device intended for use in forward osmosis processes, particularly for concentrating various process streams such as those in ponds. Particular examples of feed streams that may be concentrated are for example the following feed solutions: brines, seawater, drilling mud, wastewater, bio-digestate, and the like. Thus, the process and device described herein are useful for de-watering, and thus concentrating, the content of solar evaporation ponds and drilling mud ponds.

13 Claims, 5 Drawing Sheets

(56) References Cited

U.S. PATENT DOCUMENTS

| | | | |
|---|---|---|---|
| 2013/0264260 A1* | 10/2013 | Heinzl | 210/180 |
| 2014/0001122 A1* | 1/2014 | Schultz et al. | 210/644 |
| 2014/0175011 A1* | 6/2014 | Benton et al. | 210/644 |
| 2015/0014232 A1* | 1/2015 | McGinnis et al. | 210/180 |
| 2015/0101987 A1* | 4/2015 | Yeh et al. | 210/650 |

* cited by examiner

SUBMERGED PLATE FORWARD OSMOSIS SYSTEMS

CROSS REFERENCE TO RELATED APPLICATION

This application is a U.S. non-provisional application which is based on and claims priority to U.S. Provisional Application Ser. No. 61/667,375 filed Jul. 2, 2012, the entire disclosure of which is hereby incorporated by reference.

FIELD OF THE INVENTION

The invention relates to forward osmosis processes. Forward osmosis (FO) is a relatively new membrane technology that has very different requirements and performance than other osmotic membrane systems. In contrast to reverse osmosis (RO), which is a pressure-driven process, FO is a diffusion based process and requires a draw solution as well as a feed solution which is to be concentrated. In FO, water diffuses from a fluid of lower concentration through a highly selective membrane into a solution of higher concentration, i.e., into the draw solution. The need for two fluid streams (the draw solution and the feed solution) makes the design of FO plants more involved than pressure driven processes.

SUMMARY OF THE INVENTION

Described herein are submerged plate membrane devices and processes for using same. The device is intended for use in forward osmosis processes, particularly for concentrating various process streams. More particularly, the device is designed for use in ponds. Particular examples of feed streams that may be concentrated using the disclosed device and processes include brines, seawater, drilling mud, waste water, bio-digestate, and the like. The processes and devices described herein are useful for de-watering, and thus concentrating, the content of solar evaporation ponds and drilling mud ponds.

DETAILED DESCRIPTION OF THE INVENTION

The present invention relates to devices and processes for treating with forward osmosis ("FO") certain process streams that tend to be very difficult to process, because they are highly fouling to osmotic membranes and of high osmotic potential. Exemplary process streams to be treated by the invention are brine solutions in salt water evaporation ponds, brine solutions resulting from other processes, mine tailings, drilling mud, industrial waste waters to be treated by bioreaction, etc. In these cases, the membrane flux is typically far lower than those obtained in reverse osmosis ("RO") processes such as seawater desalination. As a result, membrane element and system design which mirrors that of RO systems becomes inappropriate. This invention is designed to use FO to treat existing process streams which are currently going to waste, waste waters, or where concentration of a process stream is necessary for production of a beneficial product.

The device of the invention involves a membrane element configuration that relies on submerged plates. Nonlimiting examples of types of feed solutions that may be treated using the device and process of the invention include drilling mud resulting from natural gas well drilling, mine tailings and brines in salt water solar evaporation ponds.

The membrane element plate device is used by submerging it either completely or partially within a pond or a vessel containing the feed solution that is to be processed or concentrated. Preferably, the device is submerged completely under the surface of the fee solution. Although it is not necessary for the feed solution to be pumped or otherwise circulated in the pond or vessel, optionally some circulation methods may be employed.

Figure 1A:
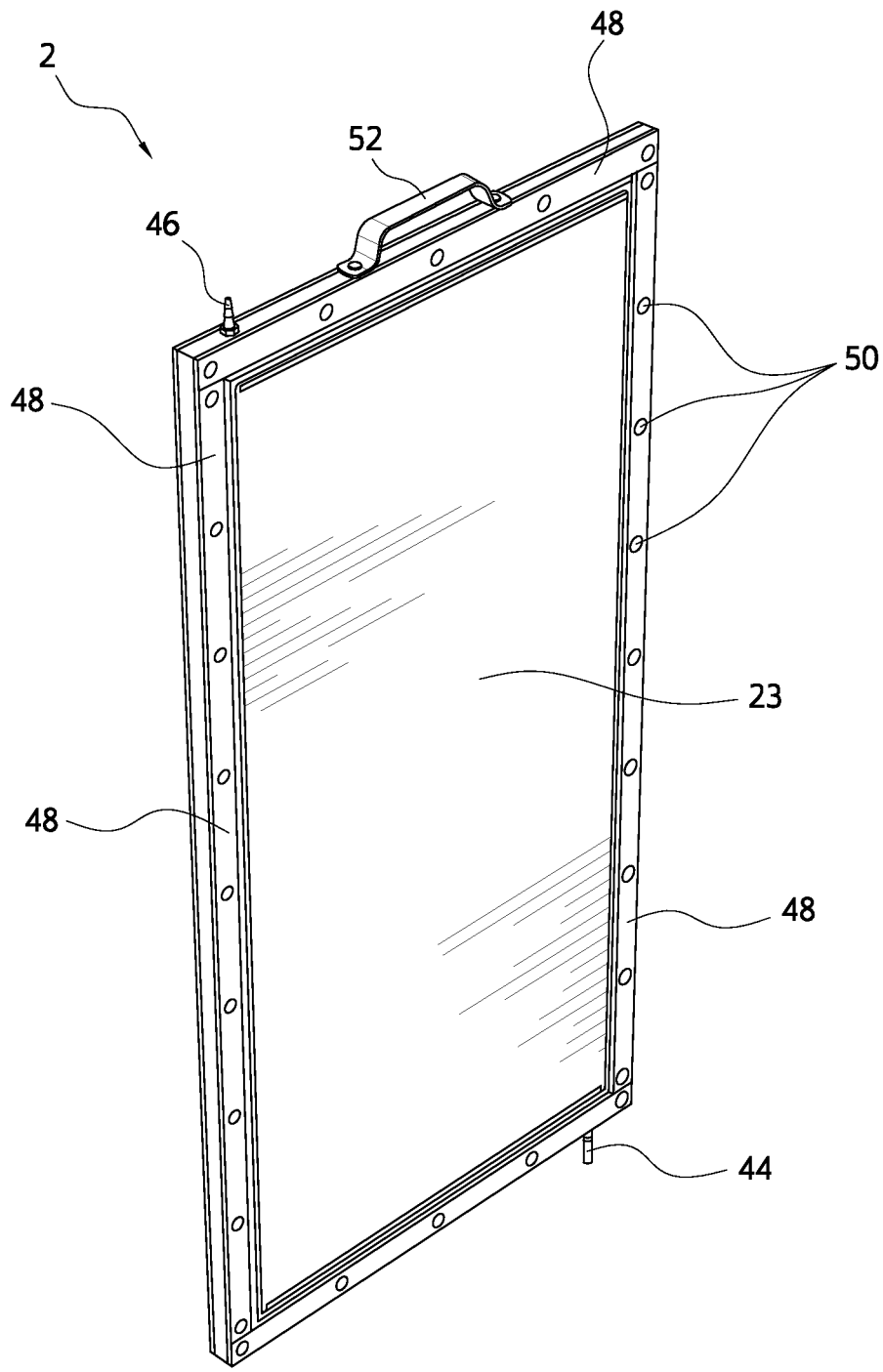
FIG. 1A is a perspective view of a device according to an embodiment of the invention.

FIG. 1A illustrates a perspective view of a device according to an embodiment of the invention. In this embodiment, a first side or face of the device 2 is shown (the reverse side is substantially a mirror image of the first side). FIG. 1A illustrates membrane 23, which is in contact with the feed solution, and a clamp 48 along the perimeter for holding the membranes 23 and 26 (membrane 26 is not shown) to the underlying support plate 20. Screws 50 assist in securing the clamp to the membrane and support plate. Also illustrated are draw solution inlet 44 and draw solution outlet 46, which are used respectively for introducing draw solution into the device and for diluted draw solution exiting the device.

When the device 2 is in use, each of the draw solution inlet 44 and draw solution outlet 46 are connected via pipes, tubing or other conduits which convey relatively concentrated draw solution into the device through inlet 44, and convey relatively diluted draw solution out of the device through outlet 46. Relatively concentrated draw solution is conveyed into the draw solution inlet, which traverses (goes through) the clamp 48. Draw solution then comes into contact with all layers of the device, and travels through the draw solution spacers and exits the device via the draw solution outlet 46. The draw solution outlet 46 also traverses (through) the clamp. In alternative embodiments, where means other than a clamp is used to secure the membrane and support plate, such as welding, the draw solution inlet and outlet traverse from the inside of the device 2 to the outside of the device.

Also shown in FIG. 1A is an optional handle 52, to assist in moving and placing the device 2.

Figure 1B:
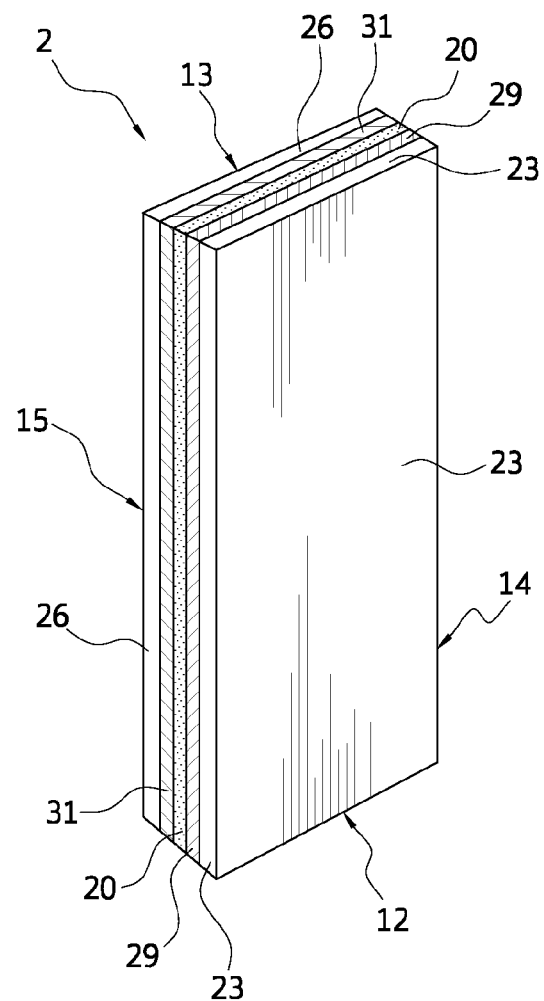
FIG. 1B is a schematic perspective view of a first side (front) and FIG. 1C is a schematic perspective view of a second side (back), each revealing a cross-section of a device according to an embodiment of the invention, showing the device's component layers.
Figure 1C:
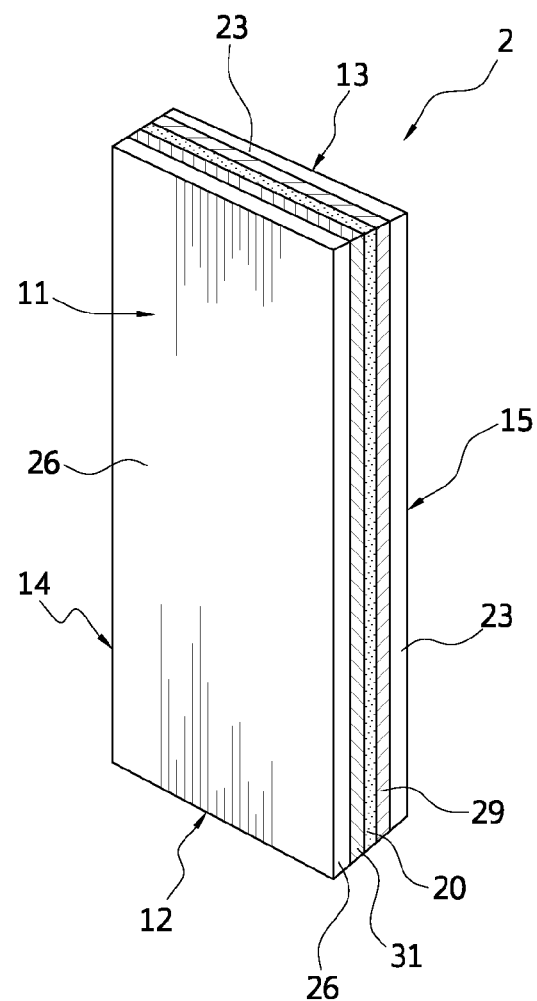

As shown in FIGS. 1B and 1C, the submerged plate FO element device 2 is comprised of a substantially planar body comprising several layers. FIGS. 1B and 1C are not drawn to scale, in order to illustrate the layers assembled together, and therefore the layers which comprise the device are shown much thicker than they are in reality. The device 2 has first 10 and second 11 substantially planar faces, each first and second planar face having: a first side 12 and a second side 13, wherein first and second sides are substantially parallel to one another, a third side 14 and a fourth side 15, wherein third and fourth sides 14, 15 are substantially parallel to one another, and the first and second sides 12, 13 are substantially perpendicular to the third and fourth sides 14, 15.

Figure 1D:
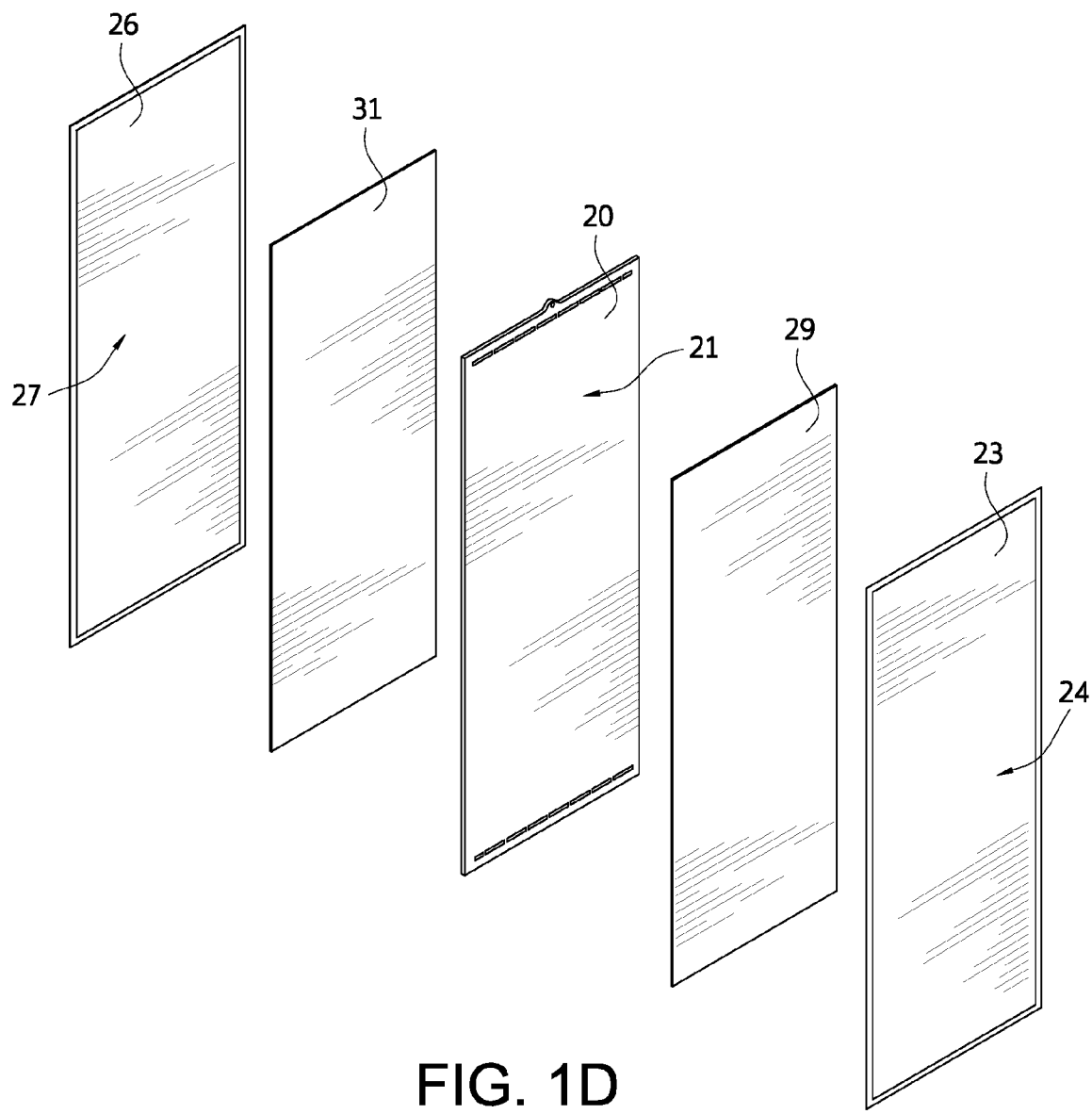
FIG. 1D is an exploded view of the device according to an embodiment of the invention.
Figure 2A:
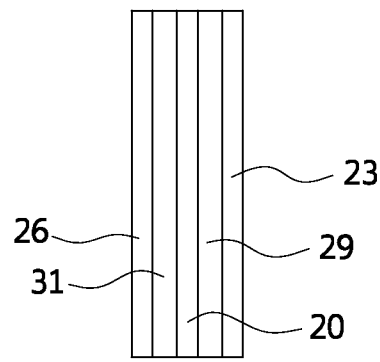
FIG. 2A is a schematic side view of either the left or right side of a device according to an embodiment of the invention.
Figure 2B:
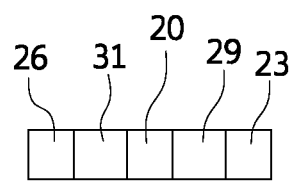
FIG. 2B is a top view.
Figure 2C:
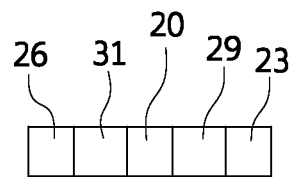
FIG. 2C is a bottom view, of a device according to an embodiment of the invention.

FIG. 1D shows an exploded view of an embodiment of the device 2, but does not show the draw solution inlet and outlet. As illustrated in FIG. 1D, in a preferred embodiment of the invention, the device 2 is comprised of the following elements arranged in layers adjacent one another:

- a support or plate 20 comprising a substantially planar body and having a first face 21 and second face 22 (face 22 is opposite face 21); FIG. 1D illustrates the support's first face 21 but second face 22 is not visible;
- a first membrane 23 comprising a substantially planar body and having a first face 24 and a second face 25 (face 24 is opposite face 25); FIG. 1D illustrates first face 24 but second face 25 is not visible;
- a second membrane 26 comprising a substantially planar body and having a first face 27 and second face 28 (face 27 is opposite face 28); FIG. 1D illustrates the first face 27 but second face 28 is not visible;
- a first draw solution spacer 29 disposed between the support 20 and the first membrane 23 and defining a first draw solution channel 30; and
- a second draw solution spacer 31 disposed between the support 20 and the second membrane 26 and defining a second draw solution channel 32.

The forward osmosis membrane device according to the invention has a plate configuration and comprises the following components:

- a substantially planar membrane support having first and second sides;
- a first substantially planar membrane affixed to the first side of the support in a substantially parallel manner;
- a second substantially planar membrane affixed to the second side of the support in a substantially parallel manner;
- a first draw channel between the first side of support and the first membrane, the first draw channel having an inlet side and an outlet side;
- a second draw channel between the second side of the support and the second membrane, the second draw channel having an inlet side and an outlet side;
- wherein the membranes' perimeters are clamped, welded or adhered to the support; and
- a draw solution inlet in communication with the inlet sides of the first and second draw channels; and a draw solution outlet in communication with the outlet sides of the first and second draw channels.

The draw channels may be formed of channels or indentations formed in the support, such as by embossing. Alternatively, the draw channels may be comprised of fabric mesh sandwiched and fixed between the support and each of the membranes. More particularly, a draw solution spacer is sandwiched between each of the membranes 23, 26 and the support 20, thereby forming channels between the support and the membrane, through which draw solution flows when the membrane element plate device is in use.

The support 20 comprises a solid plastic membrane support with membranes fixed to the plastic. The plastic support is typically about 1 to about 2 cm in thickness, and is made from a stiff, moldable, bio-resistant plastic such as ABS or PVC. Draw solution inlet and outlets or ports provide a way to introduce draw solution into and out of the device.

The perimeter of the membranes 23 and 26 are attached to the support plate 20 by clamps, or more preferably by adhesives or heat welding. Draw solution is introduced into the spacers 29 and 31 via draw solution inlet 44 at the bottom side 12 of the device 2. Draw solution exits the device 2 via draw solution outlet 46 at the top side 13 of the device. Typically, the spacers 29 and 31 are comprised of the type of fabrics used for RO permeate spacers, and are less than about 0.5 mm in thickness. Draw solution inlets and outlets typically have an inner diameter of about 3 mm or less, although other sizes are possible. It is important that the draw solution inlets and outlets do not interfere with the perimeter seal of the membranes, in order to prevent feed solution from entering the device 2 except through the membranes 23, 26. The velocity of draw solution through the spacers is typically less than about 5 cm/sec.

The membrane element plate device is operated by submerging it into a pond or vessel of a water-containing process stream product. The substance within the pond or vessel is referred to as the feed solution. The feed solution may be concentrated sea water, sewage, drilling mud or other water-containing fluid from which it is desired to remove water.

The process for concentrating a feed solution in a pond, comprises the following steps:

(a) submerging in the pond a forward osmosis membrane plate device comprising a substantially planar body and comprising: a substantially planar support having first and second sides; a first substantially planar membrane affixed to the first side of the support in a substantially parallel manner; a second substantially planar membrane affixed to the second side of the support in a substantially parallel manner; a first draw channel between the first side of the support and the first membrane, the first draw channel having an input and an outlet; and a second draw channel between the second side of the support and the second membrane, the second draw channel having an input and an outlet; and (b) introducing a flow of draw solution into the inlets of the draw channels and removing the flow of draw solution from the outlets of the draw channels;

wherein water from the feed solution moves by FO into the draw solution, thereby concentrating the feed solution.

The draw solution flow is preferably provided by applying negative pressure to the draw solution at the outlets of the draw channels.

Figure 3A:
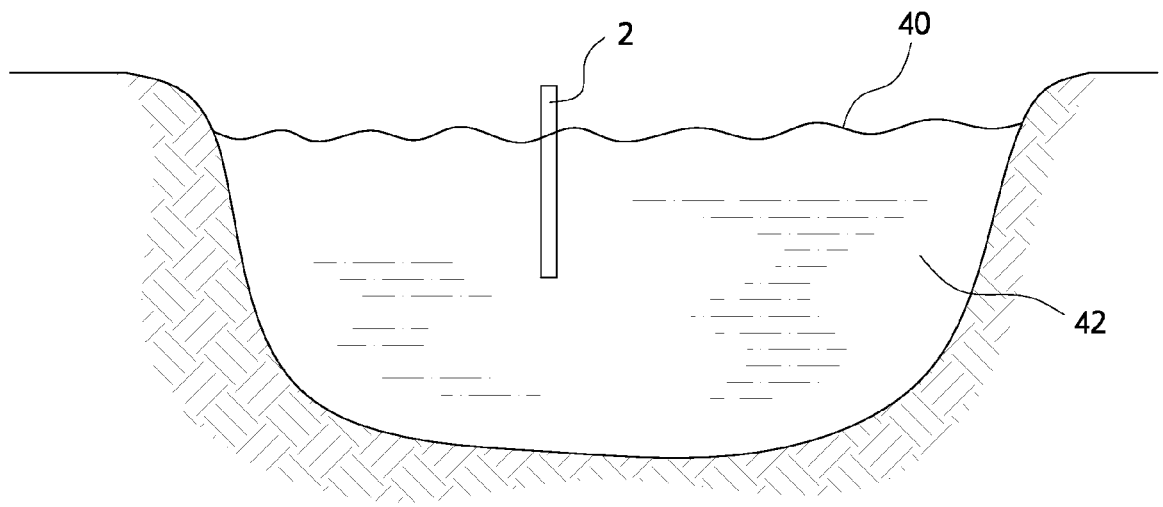
FIG. 3A illustrates a device according to an embodiment of the invention partially submersed in a pond.
Figure 3B:
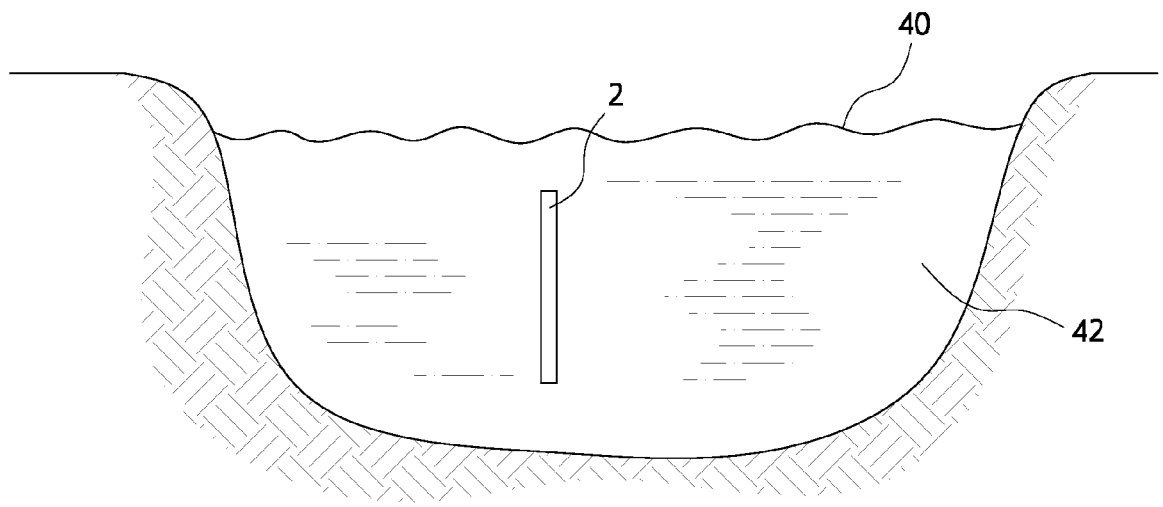
FIG. 3B illustrates a device according to an embodiment of the invention fully submerged in a pond.

Examples of the types of ponds with which the device and process may be used include solar evaporation ponds, drilling mud ponds, waste water containment ponds, mine tailings ponds and bio-digestate waste ponds. In FIGS. 3A and 3B, a pond is illustrated with one device 2 submerged within the pond. The feed solution in the pond is denoted as element 42, and the surface of the pond containing the feed solution is indicated as element 40.

In use, the device is partially submerged within the pond, as shown in FIG. 3A, so that the majority of the device is under the surface of the feed solution in the pond. However, preferably the device is fully submerged under the surface of the feed solution in the pond as shown in FIG. 3B. The device may be supported below the surface by buoyant floatation or may rest on the pond bottom.

Not illustrated in the figures are the supports for retaining the device 2 in place, or piping or other conduits through which draw solution flows into and out of the draw solution channels.

Although only a single membrane element plate device according to the invention is illustrated in each of FIGS. 3A and 3B, more typically, multiple membrane element devices are used at the same time. For example, a rack or other holding device may be used to maintain several devices side by side within the pond or other body of feed solution. Preferably, the devices are spaced about 6 mm apart from one another. The number of devices used will depend upon various factors. The rack size, i.e., the number of devices within a rack, will depend upon loading and maintenance consideration. An example of a typical rack would measure about 80 cm wide, 2 m long and 2 m high, and will contain about 80 plate devices, each plate device with a 2 m² membrane. However, other sizes of racks, quantities of plate devices, and membrane sizes may be used.

The device is submerged in a substantially vertical position within the feed solution. In other words, as shown in FIG. 3A and FIG. 3B, the device 2 is submerged so that at least the inlets of the draw solution channels are submerged.

Draw solution is introduced to the channels or spaces between the support plate and the membrane at the bottom of the vertical plate membrane element device, and diluted draw solution is removed from an outlet at the top of the device. The draw solution channels may be produced by embossing channels into the support plate or by affixing a fabric mesh between the support plate and the membrane.

As the draw solution flows through the membrane element device, water in the feed solution flows through the membranes into the draw solution within the draw solution channels, resulting in the feed solution becoming more concentrated and the draw solution becoming more diluted.

Draw solution flow through the draw solution channels is provided by suction on the outlet at the top of the draw solution channels on the device, so the draw solution pressure is always lower than that of the pond.

No pumping of the feed solution is required in order to process the feed. However, it may be advantageous to circulate the feed solution using bubbles, impellers or other circulation methods.

Water flux through the membrane is lower in submerged plates than that in pumped systems such as FO spiral wound membrane elements. due to the stagnant boundary layer on the pond (feed) side of the membrane. However, in forward osmosis processing of fouling or high osmotic potential feeds, the flux is low and the decline in flux from the effect of the external boundary layer is minimal and is of not as great importance.

In some situations using multiple membrane element devices of the invention, it is helpful to introduce a minimal or intermittent fluid flow of feed solution between the devices to break up the external boundary layer. Such flows may be steady flows of less than about 5 cm/sec, or intermittent flows of less than about 40 cm/sec occurring less than about 5% of the time. This minimal or intermittent fluid flow can be induced by air sparging below the devices, to cause bubbles to pass in the gaps between the devices, or by pumps or mixing impellers above, below or to the side of the plates.

Advantages of the submerged plate membrane element design according to the invention include reduced costs, reduced energy usage, and the ability to manually clean the elements. In addition, the submerged plate membrane element of the invention requires no additional footprint space in situations where a feed pond already exists, thereby reducing the need for land on which to place processing equipment. This is especially beneficial in situations where additional land to place processing equipment is simply not available, or is expensive to acquire. Costs and energy use are lower because the membrane housings, feed piping and pumping required in pumped systems are avoided.

The FO process is intrinsically low fouling but if the plates become fouled, the following methods may be used to remove fouling materials from the membrane element device of the invention:

1) The plates can be osmotically backflushed which is a process where the draw solution is replaced for a short period with water. This has the effect of causing water to diffuse from the draw solution side of the membrane into the feed solution. Foulants adhered to the membrane are dislodged and fall away from the plate.
2) Air spargers can be installed below the membrane plates and an intermittent discharge of large bubbles will scour many foulants from the membrane.
3) For very severe fouling, the plates can be hoisted from the pond and manually cleaned.

In one preferred embodiment of a process according to the invention, the membrane plate device element of the invention may be used by submersing it in a pond or vessel containing drilling mud, such as mud that is a byproduct of drilling of natural gas wells. The process removes water from the mud, thus reducing the volume of the mud, thereby facilitating its transport and disposal. In another embodiment of a process according to the invention, the membrane plate element device is used by submersing it in a salt water solar evaporation pond, to remove water from the salt water in the pond, thereby producing concentrated brine.

Example 1

In hydraulic fracturing for natural gas well stimulation a large amount of drilling mud is produced from the horizontal drilling operation (more than 1,000,000 gal/well). This mud is often held in a large pond during drilling then hauled away for deep well injection. As well as the water use, the cost of injection and trucking (transportation) are substantial.

After drilling the next step in the well stimulation is hydraulic fracturing (fracking) which requires even larger amounts of water. This frack water needs to be free of mud, but depending on the rock formation, it often needs to be saline. It is possible to produce clean saline water from the drilling mud by passing a strong brine through the draw solution side of an FO device according to the invention that is submerged in the drilling mud holding pond. The diluted draw solution is the used as the frack water. This has the result of reducing the volume of drilling mud to be disposed of and reducing the water needed for the fracking step.

Example 2

Solar evaporation of brines for salt production is practiced in numerous locations. Typically, the source of the brine is seawater or saline water from an inland sea. The brine is fed to a succession of ponds in which relatively pure salts are crystallized sequentially. In most cases, once valuable salts are harvested, the remaining highly soluble salts in solution are returned to the sea.

A constraint of solar evaporation is that it requires very large ponds for commercial scale production. An embodiment of the process described herein provides a way to pre-concentrate the feed brine by removing water via FO. In the process described herein, the highly concentrated waste brine remaining after the removal of valuable salts may then be used as the draw solution in FO plates which are submerged in the first pond of the sequential evaporation ponds. This concentrates the feed brine solution, and substantially simultaneously dilutes the waste brine (the draw solution) before discharge.

Specific aspects of the invention include:
1) The use of submerged plates for FO concentration.
2) Removal of foulants by osmotic backflushing, air scouring or manual cleaning.
3) Reduce solar pond footprint by osmotically pulling water from the pond.

4) Reduce equipment footprint for dewatering brine solar ponds, wastewater containment ponds, bio-digestate waste and other ponds by submerging the membrane plates in the pond.
5) Submerged plates will not negatively impact the solar activity of a solar pond.

What is claimed is:

1. A forward osmosis membrane device adapted to concentrate a feed solution in a pond having a plate configuration and comprising:
    a substantially planar membrane support having first and second sides, wherein said support is solid;
    a first substantially planar membrane affixed to the first side of the support in a substantially parallel manner;
    a second substantially planar membrane affixed to the second side of the support in a substantially parallel manner;
    a first draw channel between the first side of support and the first membrane, the first draw channel having an inlet side and an outlet side;
    a second draw channel between the second side of the support and the second membrane, the second draw channel having an inlet side and an outlet side;
    wherein said first and second draw channels are independent;
    wherein the membranes' perimeters are clamped, welded or adhered to the support; and
    a draw solution inlet in communication with the inlet sides of the first and second draw channels; and a draw solution outlet in communication with the outlet sides of the first and second draw channels; and
    wherein said device is at least partially submerged in said pond in a substantially vertical position.

2. The device of claim 1, wherein the first draw channel is comprised of channels formed in the support.

3. The device of claim 1, wherein the first draw channel is comprised of fabric mesh fixed between the support and the first membrane.

4. The device of claim 3, wherein the first and second draw channels are comprised of fabric mesh fixed between the support and each of the first and second membranes.

5. The device of claim 1, wherein the support is comprised of plastic.

6. A process for concentrating a feed solution in a pond, comprising introducing a flow of draw solution into inlets in draw channels of a forward osmosis membrane plate device submerged in the pond and removing the flow of draw solution from outlets in the draw channels,
    wherein the device comprises a substantially planar body that comprises:
    a substantially planar support having first and second sides, wherein said support is solid;
    a first substantially planar membrane affixed to the first side of the support in a substantially parallel manner;
    a second substantially planar membrane affixed to the second side of the support in a substantially parallel manner;
    a first draw channel between the first side of the support and the first membrane, the first draw channel having an input and an outlet; and
    a second draw channel between the second side of the support and the second membrane, the second draw channel having an input and an outlet;
    wherein said first and second draw channels are independent; and
    wherein water from the feed solution moves by FO into the draw solution, thereby concentrating the feed solution; and
    wherein said device is at least partially submerged in said pond in a substantially vertical position.

7. The process of claim 6, wherein draw solution flow is provided by applying negative pressure to the draw solution at the outlets of the draw channels.

8. The process of claim 7, wherein the pond is a solar evaporation pond, a drilling mud pond, a waste water containment pond, a mine tailings pond, or a bio-digestate waste pond.

9. The process of claim 6, wherein the forward osmosis membrane plate device is fully submerged in the pond.

10. A process for concentrating a feed solution in a pond, comprising the steps of:
    (a) submerging in the pond a forward osmosis membrane plate device comprising a substantially planar body and comprising:
    a substantially planar support having first and second sides, wherein said support is solid;
    a first substantially planar membrane affixed to the first side of the support in a substantially parallel manner;
    a second substantially planar membrane affixed to the second side of the support in a substantially parallel manner;
    a first draw channel between the first side of the support and the first membrane, the first draw channel having an input and an outlet; and
    a second draw channel between the second side of the support and the second membrane, the second draw channel having an input and an outlet;
    wherein said first and second draw channels are independent; and
    (b) introducing a flow of draw solution into the inlets of the draw channels and removing the flow of draw solution from the outlets of the draw channels;
    wherein water from the feed solution moves by FO into the draw solution, thereby concentrating the feed solution; and
    wherein said device is at least partially submerged in said pond in a substantially vertical position.

11. The process of claim 10, wherein draw solution flow is provided by applying negative pressure to the draw solution at the outlets of the draw channels.

12. The process of claim 10, wherein the pond is a solar evaporation pond, a drilling mud pond, a waste water containment pond, a mine tailings pond or a bio-digestate waste pond.

13. The process of claim 10, wherein step (a) comprises fully submerging the forward osmosis membrane plate device in the pond.

* * * * *